(12) United States Patent
Pandya et al.

(10) Patent No.: US 12,067,707 B2
(45) Date of Patent: *Aug. 20, 2024

(54) MULTIMODAL SAFETY SYSTEMS AND METHODS

(71) Applicant: Everguard, Inc., Irvine, CA (US)

(72) Inventors: Sandeep Pandya, Irvine, CA (US); Sundeep Ahluwalia, San Diego, CA (US); Changsoo Jeong, Ranchos Palos Verdes, CA (US); Michael Korkin, Glendale, CA (US); Kyungsuk Lee, Ranchos Palos Verdes, CA (US); Christopher Ro, Aliso Viejo, CA (US); Yong Wu, Signal Hill, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/497,595

(22) Filed: Oct. 30, 2023

(65) Prior Publication Data

US 2024/0078656 A1 Mar. 7, 2024

Related U.S. Application Data

(63) Continuation of application No. 17/241,737, filed on Apr. 27, 2021, now Pat. No. 11,803,955.

(Continued)

(51) Int. Cl.
*G08B 21/02* (2006.01)
*G01P 13/00* (2006.01)
(Continued)

(52) U.S. Cl.
CPC ............ *G06T 7/0004* (2013.01); *G01P 13/00* (2013.01); *G01S 17/42* (2013.01); *G01S 17/894* (2020.01);
(Continued)

(58) Field of Classification Search
CPC ......... G06T 7/0004; G06T 2207/10028; G06T 2207/20081; G06T 2207/30108;
(Continued)

(56) References Cited

U.S. PATENT DOCUMENTS

2015/0332463 A1 11/2015 Galera
2018/0082244 A1* 3/2018 Brazeau ................. G06Q 10/08
(Continued)

FOREIGN PATENT DOCUMENTS

| CN | 104376348 | 2/2015 |
| CN | 107742141 | 2/2018 |
| KR | 101907964 | 10/2018 |

OTHER PUBLICATIONS

"AI Insights for a Safer, Healthier and Productive Workforce." WearHealth, wearhealth. com/. Accessed on Apr. 22, 2020. (5 pages).

(Continued)

*Primary Examiner* — Stephen P Coleman
(74) *Attorney, Agent, or Firm* — ESPLIN & ASSOCIATES, PC

(57) ABSTRACT

Multimodal systems are provided for managing safety in an industrial environment. The system comprises: (a) a computer vision component for generating a first output data; (b) a real-time locating component for generating a second output data about an object within the industrial environment and a mobile tag device deployed to the object; (c) a LIDAR component for generating a third output data; and (d) an edge computing device connected to the computer vision component, the real-time locating component and the LIDAR component via a local network, and is configured to: (i) receive a data stream including the first output data, the second output data and the third output data, (ii) process the data stream using a machine learning algorithm trained (Continued)

model to generate a safety related result and feedback data, and (iii) deliver the feedback data to the object via the mobile tag device.

20 Claims, 3 Drawing Sheets

Related U.S. Application Data

(60) Provisional application No. 63/018,109, filed on Apr. 30, 2020.

(51) Int. Cl.
*G01S 17/42* (2006.01)
*G01S 17/894* (2020.01)
*G06T 7/00* (2017.01)
*G06V 20/52* (2022.01)

(52) U.S. Cl.
CPC ............. *G06V 20/52* (2022.01); *G08B 21/02* (2013.01); *G06T 2207/10028* (2013.01); *G06T 2207/20081* (2013.01); *G06T 2207/30108* (2013.01)

(58) Field of Classification Search
CPC ........ G01P 13/00; G01S 17/42; G01S 17/894; G06V 20/52; G08B 21/02
USPC .......................................................... 382/103
See application file for complete search history.

(56) References Cited

U.S. PATENT DOCUMENTS

| | | |
|---|---|---|
| 2018/0276841 A1 | 9/2018 | Krishnaswamy |
| 2019/0258878 A1 | 8/2019 | Koivisto |
| 2020/0089942 A1 | 3/2020 | Man |
| 2020/0202208 A1 | 6/2020 | Li |

OTHER PUBLICATIONS

"Guardhat." Guardhat, http://www.guardhat.com/. Accessed on Apr. 22, 2020. (2 pages).
"Video Analytics Partner." EasyFlow, easyflow.biz/. Accessed on Apr. 22, 2020. (10 pages).
Co-pending U.S. Appl. No. 17/241,737, inventors Pandya; Sandeep et al., filed Apr. 27, 2021. (65 pages).
Smartvid.io, Inc. "Minimize Risk across Projects with the Smartvid.io Platform." Minimize Risk across Projects with the Smartvid.io Platform, http://www.smartvid.io/our-platform. Accessed on Apr. 22, 2020. (4 pages).

* cited by examiner

MULTIMODAL SAFETY SYSTEMS AND METHODS

CROSS-REFERENCE TO RELATED APPLICATIONS

Background

Safety and risk management in the industrial environment is critical. When safety monitoring is neglected, workplace injuries can result in devastating impact on workers, companies and industries. The alarming fact that 21% of workplace fatalities and injuries occur in constructions is an indicator that dramatic safety improvements are needed on jobsites.

Safety and risk management in the industrial environment is challenging. It can encompass various aspects from safety protocol compliance, operational processes administration, collision avoidance, hazardous condition warning, fatigue management, trip and fall detection to behavioral adherence of the workers or personnel. The conventional safety approach deployed in industrial context may rely on a combination of direct human supervision, CCTV monitoring, and passive alerts when safety protocols are breached which may cause clerical overload, lack of real time monitoring, situational awareness and insights into worker activity, machine operations or real-time proactive alerts.

SUMMARY

Recognized herein is a need for methods and systems for managing safety and risk in a hazardous workplace with improved efficiency and accuracy. The present disclosure provides systems and methods for managing safety and risk of personnel performing operations in hazardous environments. In particular, the provided systems and methods utilize artificial intelligence (AI) solution that scans through multi-sensor inputs in real-time and proactively alerts workers and managers to safety concerns. In some embodiments of the disclosure, the provided multimodal safety system includes computer vision, real-time locating system (RTLS), light detection and ranging (LIDAR) system and other sensors to provide a comprehensive coverage for each safety/work zone. The multimodal safety system of the present disclosure fuses computer vision, real-time locating, AI, sensor fusion and analytics in combination with multiple sensors to provide live, actionable oversight that ensures worker safety.

Additionally, the multimodal safety system provides personal protective equipment (PPE) detection, safety zone compliance and fall detection, and various other functionalities. For example, upon detection of a safety infraction, workers may be immediately notified via haptic feedback on their personal alert device. Alert video and metadata are simultaneously sent to the safety manager portal for post-event analysis and coaching. The personal alert device may be a precise positioning wearable device showing worker and asset locations within less than 1.5 feet and can alert workers of danger zones and restricted areas before accidents happen. The personal alert device may be an industrial-grade wearable device.

In some embodiments of the present disclosure provide a platform allowing for real-time situational awareness and insights into worker activity thereby increasing productivity and ensuring workers are acting within safety parameters. Systems and methods of the present disclosure provide an end-to-end solution that offers actionable insights in real time. Systems and methods of the present disclosure combines computer vision and sensor fusion to provide safety at the edge for precise worker activity recognition. An analytics portal of the platform may deliver continuous safety data to help recognize improvements on worker behavior and operations management, as well as maintenance of devices, applications running on the edge and the cloud.

The real-time platform of the present disclosure may cooperate ultra-accurate and reliable wearables with computer vision, machine learning and AI to improve productivity and safety. The platform may be configured for managing workplace safety and risk, detecting, predicting and managing risks in the industrial environment. The platform may comprise a multimodal industrial safety system utilizing machine learning and AI technologies to optimize fusion of multimodal data. In some embodiments of the disclosure, the multimodal safety system may utilize three different sensory modalities: a computer vision component, a real-time locating component, and a LIDAR component.

Each of the three modalities may have their own advantages and disadvantages. It is desirable to provide an intelligent system to fuse these modalities in an optimized manner to improve the accuracy and efficiency of providing a 3D scene map with understanding of the scene (e.g., location tracking, identity recognition, collision avoidance, fall and trip detection, accident or risk detection and prediction, anomaly detection, etc.) thereby causing an appropriate action such as the delivery of individual or group alerts to workers, as well as other actions (e.g., interventions, control commands to machines to change operation state, etc.) to improve industrial safety.

Computer vision (CV) techniques or computer vision systems have been used to process images to extract high-level understanding of the scene (e.g., industrial workplace, construction site, etc.). CV techniques may have the capabilities of object detection, object tracking, action recognition/classification or generating descriptions of a scene (e.g., object detection, object classification, extraction of the scene depth and estimation of relative positions of objects, extraction of objects' orientation in space, anomaly detection, detection of an unsafe situation, etc.). However, CV systems are known to have limited accuracy. For example, deep convolutional neural networks are known to improve accuracy with an increased number of network layers. One source of inaccuracy in computer vision is the limited computational power, constrained by cost, size, weight, power, and heat dissipation. Another source of inaccuracy in computer vision is the limited resolution. An effective system resolution is a product of the intrinsic and extrinsic factors. Intrinsic factors may include, for example, optical blur of the camera's lens, focal length, and the spatial sampling rate of the image sensor. Extrinsic factors include illumination of the scene and its dynamic range. Target image brightness under given illumination is typically achieved by setting the exposure time. Longer exposure causes motion blur as a result of object motion or camera physical motion thereby reducing effective system resolution. To avoid motion blur, target image brightness may be achieved by increasing or decreasing the imaging system's gain. Increased gain amplifies signal noise which similarly reduces the effective system resolution. Furthermore, the location tracking by individual's identification is more challenging in industrial context or uniformed environments where individuals become visually indistinguishable due to similar uniform (e.g., PPE) which may result in errors in identity tracking.

Real-time locating system (RTLS) may automatically identify and track the location of objects or people in real time, usually within a building or other contained area. RTLS may involve using wireless RTLS tags attached to objects or worn by people, and in most RTLS, fixed reference points receive wireless signals from tags to determine their location. However, inaccuracy in the RTLS measurement can be caused by multi-path reflections of radio waves from objects in the scene, poor antenna sensitivity, weak radio signal strength, obstructions and occlusions in the line of sight between transceivers and signal attenuation by large metal objects.

Light detection and ranging (LIDAR) technology can be used to obtain three-dimensional information of an environment by measuring distances to objects. In contrast to the real-time locating systems that provide sparse scene coverage representing locations of a small number of mobile tags present in the scene (e.g., trajectories of individuals), LIDAR can provide a substantially dense three-dimensional representation of the scene. However, inaccuracy in LIDAR system may be caused by obstructions and occlusions in the line of sight which may lead to potential misclassification of environment and resolution in the 3D space.

The multimodal safety system or platform may combine the three different sensory modalities i.e., a computer vision component, a real-time locating component, and a LIDAR component via an intelligent fusion framework. In some cases, the multimodal safety system may be capable of detecting objects' locations in the scene and identifying them by utilizing mobile tag data provided by the real-time locating component and then tracking objects' orientation, relative positions and boundaries in three dimensions in real-time by using LIDAR point cloud data and camera images. In some cases, a proximity between two or more objects in the scene as determined by the system from mobile tag data, camera images and LIDAR data may cause an alert delivered to an individual worker or a group if such proximity falls below set thresholds to prevent a collision.

In some cases, the provided systems and methods may help individuals or workers to comply with safety protocols, improve situational awareness for hazardous environments and conditions, and enforce pro-active safety behaviors based on real-time tracking and situation detection.

Example embodiments are described with reference to the management and monitoring of safety in an industrial environment (e.g., construction site). However, it is to be understood that the invention itself is more broadly applicable, and other example embodiments may be applied to the tracking of persons and objects and providing safety alert and actions in any place that may or may not be a workplace.

An aspect of the present disclosure provides methods and systems for managing safety in an industrial environment. The system may be a multimodal system that comprises: (a) a computer vision component for generating a computer vision output data; (b) a real-time locating component for generating location data of an object within the industrial environment and a mobile tag device located at the object; (c) a LIDAR component for generating 3D point cloud data of the industrial environment; and (d) an edge computing device connected to the computer vision component, the real-time locating component and the LIDAR component via a local network, and the edge computing device is configured to: (i) receive a data stream including the computer vision output data generated in (a), the location data generated in (d) and the 3D point cloud data generated in (c), (ii) process the data stream with aid of a machine learning algorithm trained model to generate a safety related result and a safety related action, and (iii) deliver the safety related action via the mobile tag device.

In one aspect, a multimodal system is provided for managing safety in an industrial environment. The multimodal system comprises: a computer vision component for generating a computer vision output data; a light detection and ranging (LIDAR) component for generating 3D point cloud data of the industrial environment; and an edge computing device connected to the computer vision component, the real-time locating component and the LIDAR component via a local network. The edge computing device is configured to: receive a data stream including the computer vision output data, the location data and the 3D point cloud data to generate an input feature dataset; process the input feature dataset using a machine learning algorithm trained model to generate a safety related result and feedback data, and deliver the feedback data to the object via the mobile tag device.

In some embodiments, the computer vision output data comprises a description of the industrial environment. In some embodiments, the computer vision output data comprises an action identified for the object.

In some embodiments, the real-time locating component further comprises one or more reference point devices deployed within the industrial environment to provide a coverage at least partially overlaps with a view of the computer vision component. In some embodiments, the mobile tag device comprises a motion sensor collecting motion data about the object.

In some embodiments, the 3D point cloud data is analyzed to detect a change in the industrial environment. For example, the change is related to a construction progress, materials or an equipment within the industrial environment.

In some embodiments, the input feature dataset is generated by aligning the data stream with respect to time and/or the identity of the object.

In some embodiments, the feedback data comprises a control signal to effect an operation of the object. In some embodiments, the safety related result includes a detection of an action of the object that does not comply with a safety protocol and the feedback data comprises an alert indicative of the detection.

In a related yet separate aspect, a method for managing safety in an industrial environment is provided. The method comprises: generating, using a computer vision component, a computer vision output data; generating, using a real-time locating component, location data and identity about an object within the industrial environment, where the real-time locating component includes a mobile tag device deployed to the object; generating, using a light detection and ranging (LIDAR) component, 3D point cloud data of the industrial environment; receiving a data stream including the computer vision output data, the location data and the 3D point cloud data to generate an input feature dataset; processing the input feature dataset using a machine learning algorithm trained model to generate a safety related result and feedback data, and delivering the feedback data to the object via the mobile tag device.

In some embodiments, the computer vision output data comprises a description of the industrial environment. In some embodiments, the computer vision output data comprises an action identified for the object.

In some embodiments, the real-time locating component further comprises one or more reference point devices deployed within the industrial environment to provide a coverage at least partially overlaps with a view of the computer vision component. In some embodiments, the mobile tag device comprises a motion sensor collecting motion data about the object.

In some embodiments, the 3D point cloud data is analyzed to detect a change in the industrial environment. In some cases, the change is related to a construction progress, materials or an equipment within the industrial environment.

In some embodiments, the input feature dataset is generated by aligning the data stream with respect to time and/or the identity of the object. In some embodiments, the feedback data comprises a control signal to effect an operation of the object. In some embodiments, the safety related result includes a detection of an action of the object that does not comply with a safety protocol and the feedback data comprises an alert indicative of the detection.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

Figure 1:
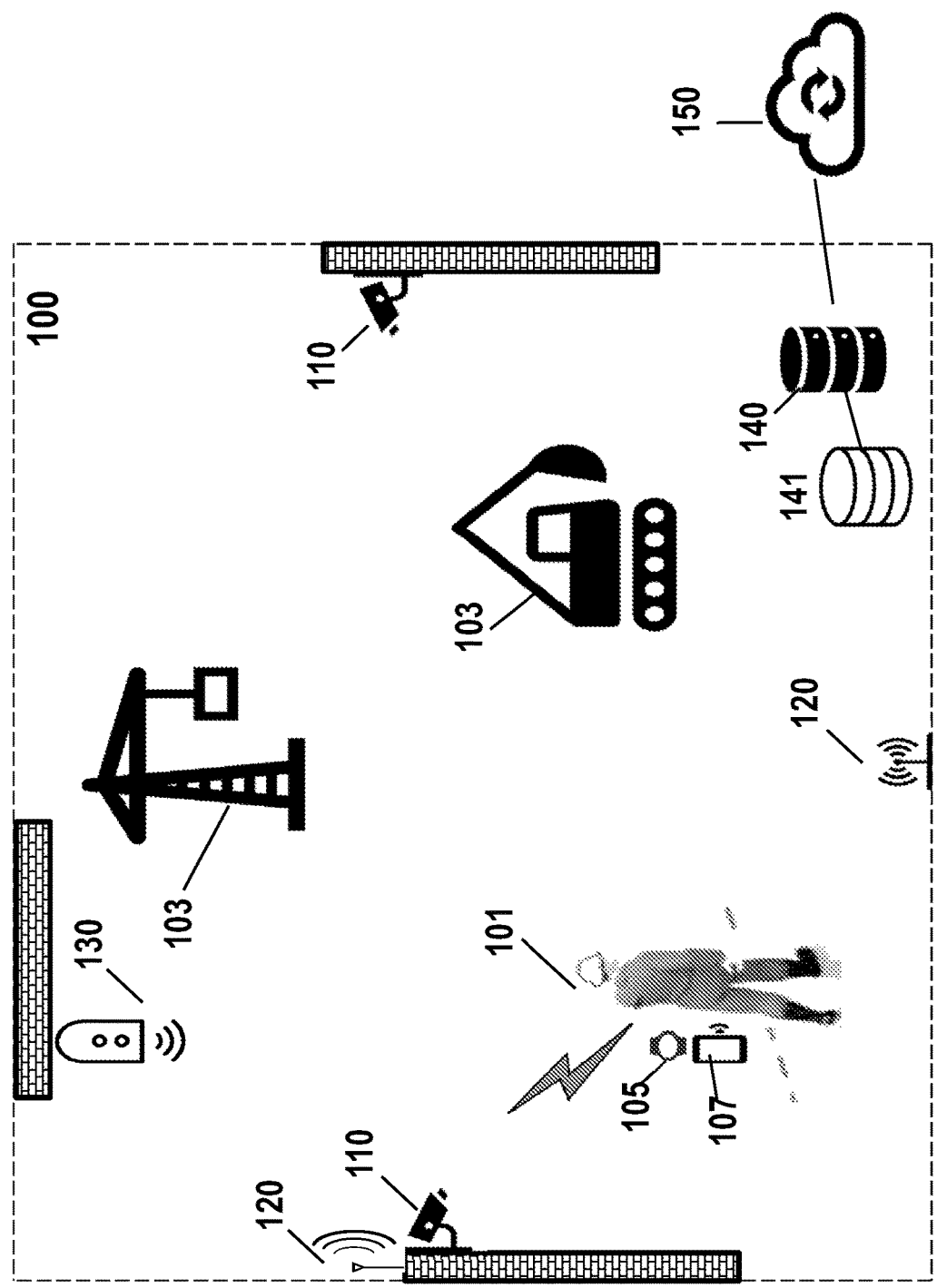
FIG. 1 schematically illustrates a multimodal safety system implemented in an industrial environment, in accordance with some embodiments of the present disclosure.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Certain Definitions

Unless otherwise defined, all technical terms used herein have the same meaning as commonly understood by one of ordinary skill in the art to which this invention belongs.

Reference throughout this specification to "some embodiments," or "an embodiment," means that a particular feature, structure, or characteristic described in connection with the embodiment is included in at least one embodiment. Thus, the appearances of the phrase "in some embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," "unit" and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In some cases, a component can emulate an electronic component via a virtual machine, e.g., within a cloud computing system.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form The term "real-time," as used herein, generally refers to a response time of less than 1 second, tenth of a second, hundredth of a second, a millisecond, or less, such as by a computer processor. Real-time can also refer to a simultaneous or substantially simultaneous occurrence of a first event with respect to occurrence of a second event. One or more operations in the present disclosure can be performed in real-time or near real-time.

The present disclosure provides methods and systems for safety management in a hazardous environment. The hazardous environment may be a remote workplace, an indoor workplace, an outdoor workplace, a place where hazardous work is conducted such as an industrial environment, a construction site, manufacturing plants and various others that can be dynamic, complex, and hazards can arise from the unsafe behavior of on-site personnel and/or equipment (e.g., machines, vehicles, etc.). The present disclosure may provide situational awareness functionality, safety management based on location tracking and situation detection that may be used in various contexts, including construction site, shipping, industrial environments and various other industries. The real-time location tracking, behavior enforcement and situational awareness functionality of the present disclosure may be used for various uses, such as Internet of Things (IoT) platforms, health-monitoring software applications and business processes or industrial workplace management, and for organizations in energy, manufacturing, aerospace, automotive, chemical, pharmaceutical, telecommunications, healthcare, the public sector, and others.

Multimodal Safety System

The present disclosure provides systems and methods for managing safety in a hazardous workplace. In particular, the provided systems and methods can be applied to safety and risk detection or management related to various aspects of industrial workplace including, for example, worker's safety behavior change or guide, real-time alert or warning to workers, safety control of equipment to avoid collision or accident, location tracking of workers, materials or equipment's within a construction site, situational awareness of hazardous work, safety protocol compliance, and dealing with accidents and other unsafe events happening to the workers during operation.

The multimodal safety system may be a location and/or time-based system that may utilize real-time multimodal sensor data for incident detection, location tracking per identification, alerting, triggering safety operation of machines, and safety behavior compliance. In some cases, the multimodal safety system can analyze data collected from multi-modal sensory systems or devices to generate contextual descriptions of 3D scene which may include object detection, object classification, extraction of the scene depth and estimation of relative positions of objects, extraction of objects' orientation in space, anomaly detection, detection of an unsafe situation, identification of safety operation processes, capturing worker-based metrics (e.g., fatigue level, health condition, under-stress, physiological state, etc.), detecting an incident (e.g., trip, slip or fall detection), identification of a hazardous situation or hazardous conditions in a work zone of a workplace, identification an efficient workflow for one or more workers and one or more groups within a workplace and various others.

In other embodiments, multimodal sensory data may be collected from a computer vision system, a real-time locating system (RTLS), a LIDAR system and wearable sensors worn by or attached to personnel performing tasks within a workplace. The sensor data, processed data, and related data flow may be communicated over a network suitable for use in an industrial environment that may be indoor environment, outdoor environment, or a combination of both. In some cases, the environment may be dynamically changing (e.g., construction site). In some cases, the environment may be a remote area with limited wireless Internet or cellular network access, or an area without connection to a wide area network ("WAN") or an inter-network (e.g., the Internet).

FIG. 1 schematically illustrates a multimodal safety system implemented in an industrial environment 100. The multimodal safety system may comprise a set of connected devices, one or more physiologic or kinematic sensors 105, an edge gateway (e.g., edge computing device/server) 140 for processing data collected from the multimodal sensory devices/systems 110, 120, 130 and providing real-time feedback to an individual 101 or user (e.g., onsite manager), and a backend management system 150 (e.g., cloud server).

In some embodiments of the present disclosure, the multimodal safety system may employ an edge intelligence paradigm that data processing and prediction/inference is performed at the edge or edge gateway 140 while the predictive models may be built, developed and trained on the backend management system 150 residing on a cloud/data center and run on a user device (e.g., hardware accelerator) deployed at the scene 100 and/or the edge computing device 140 for inference. For instance, sensor data stream may be sent to the on-site edge computing device 140 in real-time for managing on-site operations, safety and risk within a construction site, whereas a message package comprising batch data may be sent to a remote management console or the cloud at a lower frequency for post-event analysis. Details about the network configuration and data processing are described later herein.

In some cases, at least part of the multimodal safety system may be deployed in a hazardous worksite such as a construction site. In some situations, the worksite may be facilitated with local area network but may have limited wireless Internet or cellular network access particularly when the worksite is in a remote area that is remote from a wide area network ("WAN") or an inter-network (e.g., the Internet), or when the worksite is a temporary or dynamic worksite without sufficient network coverage. The worksite may have indoor and outdoor area or work/safety zones where operations, tasks and duties are performed.

Operations or tasks performed by one or more individuals 101 (e.g., workers, operators) may be tracked and guided based on real-time sensor data and feedbacks. In further embodiments of the disclosure, at least part of the sensor data may be captured by the multimodal sensory systems and one or more sensors from a user's electronic device, such as user's wearable device, mobile tag devices 105, and the like.

In some embodiments, an individual 101 (e.g., operator, worker) may be associated with one or more sensors. In some cases, an individual may be associated with one or more types of sensors that can be located on the individual's body (e.g., attached to skin), a part of body (e.g., wearable device or mobile tag devices 105) or clothing (e.g., PPE). In some cases, the one or more types of sensors may be located remotely from an individual, such as deployed in an environment (e.g. wall-mounted, attached to a machine, vehicle or other equipment, etc.) or located on a user device.

The user device may be a wearable device or a mobile tag device 105 provided to a worker 101. The user device may provide precise tracking of the individual 101 such as a mobile tag device. In some cases, the user device may be a precise positioning wearable device showing worker and asset locations within less than 1.5 feet and can alert workers of danger zones and restricted areas before accidents happen. The user device may be an industrial-grade wearable device. The user device may include other computing devices that are capable of presenting feedback information to a user. Examples of user devices may include, but are not limited to, mobile devices, smartphones/cellphones, tablets, personal digital assistants (PDAs), laptop or notebook computers, desktop computers, media content players, virtual reality systems, augmented reality systems, or microphones. The user device may be any electronic device capable of analyzing, receiving user input data (e.g., receiving user input for an incident report or trigger an emergency alert, etc.), providing or displaying certain types of feedback data (e.g., adverse event statistics, alert, behavior change cue, etc.) to a user. In some cases, a manager user device may be provided to one or more managers, supervisors or users allowing them to monitor and view the real-time safety condition in the worksite.

In preferable embodiments of the present disclosure, the multimodal sensory systems and devices may comprise at least a computer vision-based system 110, a RTLS 120, 105 and LIDAR system 130. The multimodal sensory systems may further include various types of sensors carried/worn by or attached to the individuals 101 or an equipment 103. For example, one or more types of sensors may be included in a mobile tag device 105 worn by or attached to the individuals 101 or an equipment 103 (e.g., machine, vehicle, construction site equipment, asset, etc.).

In some embodiments of the present disclosure, the mobile tag device 105 may serve as a radio transmitter as part of the RTLS component for tracking identification/location of the individual 101 and/or equipment 103. For example, the mobile tag devices 105 may be BLE compatible so as to determine an individual's or mobile equipment's relative physical location to a beacon. In some cases, the mobile tag device 105 may be a precise positioning wearable device showing worker and asset locations within less than 1.5 feet and can alert workers of danger zones and restricted areas before accidents happen. The mobile tag device 105 may be an industrial-grade wearable device.

In yet another embodiment of the present disclosure, the mobile tag device 105 may include sensors such as physiologic sensors, kinematic sensors, audio sensors, inertial sensors (e.g., accelerometers, gyroscopes, and/or gravity detection sensors, which may form inertial measurement units (IMUs)), location sensors (e.g., global positioning system (GPS) sensors, mobile device transmitters enabling location triangulation), heart rate monitors, external temperature sensors, skin temperature sensors, skin conductance, neural signals (e.g. EEG), muscle signals (e.g. EMG), capacitive touch sensors, sensors configured to detect a galvanic skin response (GSR), vision sensors (e.g., imaging devices capable of detecting visible, infrared, or ultraviolet light, such as cameras), proximity or range sensors (e.g., ultrasonic sensors, lidar, time-of-flight or depth cameras), attitude sensors (e.g., compasses), pressure sensors (e.g., barometers), humidity sensors, vibration sensors, audio sensors (e.g., microphones), and/or field sensors (e.g., magnetometers, electromagnetic sensors, radio sensors). Sensor data provided by the mobile tag device may be analyzed along with the data collected from the multimodal sensory components to further improve the accuracy and understanding of the worksite safety conditions.

In some cases, the mobile tag device (e.g., wearable device 105) may be capable of delivering an alert (e.g., vibration, audio alarm, etc.) in response to a detection of an incident (e.g., trip, fall), an intervention for changing behavior (e.g., fatigue detection or heat exhaustion) or forecasting a hazardous situation (e.g., prediction of an impending adverse event in a work zone or a physiological condition of the individual). For example, upon the prediction of an impending adverse event (e.g., entering a hazardous work zone, reaching a fatigue level, etc.), intervention such as rhythmic cue, audio, visual, or tactile stimulus may be delivered to the worker via the wearable device, mobile tag device 105 or sensors. In another example, upon detection of a safety infraction, workers may be immediately notified via haptic feedback on the mobile tag device 105. The alert video and metadata may be simultaneously sent to the safety manager portal for post-event analysis and coaching on the remote entity 150.

As described above, in some cases, the multimodal safety system may comprise connected sensors deployed in various locations within the environment 100 for detecting a hazardous situation or adverse event in the environment and providing warning or feedback information. In some situations, the environment may be a worksite that can have various regions or work zones which can be associated with a plurality of sensors deployed therein. The plurality of sensors may comprise cameras, LIDAR device and transceivers as part of the computer vision-based system 110, a RTLS component 120, 105 and LIDAR system 130. In some cases, sensors deployed within the worksite can further include, for example, a navigation system of a mobile worksite (e.g., vessel or ship) such as radar, sonar, differential global positioning system (DGPS), sensors on a user device such as inertial measurement unit (IMU), gyroscopes, magnetometers, accelerometers, audio sensors, conductivity sensors, ambient environment sensors such as temperature/heat sensors, chemical sensors, biological sensors, radiation sensors, or any other type of sensors, or combination thereof. The plurality of sensors deployed throughout the target scene may be used to detect ambient environment condition in a work zone, and/or work in conjunction with the sensor or user devices for location and time-based tracking, incident detection, and providing situational awareness to the individuals 101.

The computer vision-based system 110 may include one or more cameras deployed at the worksite. In some cases, the camera may be a video camera. The camera may comprise optical elements and image sensor for capturing image data. The image sensors may be configured to generate image data in response to wavelengths of light. A variety of image sensors may be employed for capturing image data such as complementary metal oxide semiconductor (CMOS) or charge-coupled device (CCD). In some cases, the image sensor may be provided on a circuit board. The circuit board may be an imaging printed circuit board (PCB). The PCB may comprise a plurality of electronic elements for processing the image signal. For instance, the circuit for a CMOS sensor may comprise A/D converters and amplifiers to amplify and convert the analog signal provided by the CMOS sensor. Optionally, the image sensor may be integrated with amplifiers and converters to convert analog signal to digital signal such that a circuit board may not be required. In some cases, the output of the image sensor or the circuit board may be image data (digital signals) that can be further processed by a camera circuit or processors of the camera. In some cases, the image sensor may comprise an array of optical sensors.

In some cases, the camera may be a plenoptic camera having a main lens and additional micro lens array (MLA). The plenoptic camera model may be used to calculate a depth map of the captured image data. In some cases, the image data captured by the camera may be grayscale image with depth information at each pixel coordinate (i.e., depth map). The camera may be calibrated such that intrinsic camera parameters such as focal length, focus distance, distance between the MLA and image sensor, pixel size and the like are obtained for improving the depth measurement accuracy. Other parameters such as distortion coefficients may also be calibrated to rectify the image for metric depth measurement. The depth measurement may then be used for generating a 3D scene map and may be complemented by data provided by the RTLS component and LIDAR system.

As described above, the camera or the computer vision-based system 110 may perform pre-processing of the capture image data. In an embodiment, the pre-processing algorithm can include image processing algorithms, such as image smoothing, to mitigate the effect of sensor noise, or image histogram equalization to enhance the pixel intensity values. In some cases, one or more processors of the computer vision-based system 110 may use optical approaches as described elsewhere herein to generate a depth map of the target scene 100. For instance, an application programming interface (API) of the computer vision-based system 110 may output a focused image with depth map. Alternatively, the depth map may be generated by a safety inference engine of the system.

The RTLS component 120 may include a plurality RTLS reference points, that can be either transmitters, receivers, or transceivers deployed throughout the workplace 100 to provide the desired mobile tag coverage. The RTLS reference points may be a plurality of devices such as Beacon devices for indoor/outdoor positioning or wireless communication. In some cases, the local network may allow for indoor/outdoor position tracking, such as populating the indoor/outdoor space with Bluetooth Low Energy (BLE) beacons that transmit a continuous stream of packets that are picked up by a BLE sensor on the mobile tag device 105 or the wearable device.

For instance, with BLE, a position of mobile tag devices 105 (e.g., wearable devices) can be identified based on the proximity technology. The proximity technology may include a plurality of beacons distributed about a premise through which an individual 101 or mobile equipment 103 is located or to navigate. The mobile tag devices 105 may be BLE compatible so as to determine an individual's or mobile equipment's relative physical location to a beacon. Based on ranging data or approximate distance between user's device to each beacon along with the unique beacon's properties, different level of positioning accuracy can be achieved. For instance, the proximity technology may determine the location of a mobile tag devices 105 based on a proximity estimate of signal strength emitting from beacon. In addition, it can be enhanced with a beacon triangulation method to determine the (x, y, z) local map coordinates of individual's position referencing to three or more beacons in proximity. The receiver can estimate its position using average of x,y,z localized coordinates of a floor map for e.g. (x1, y1, z1), (x2, y2, z2) and (x3, y3, z3). The RTLS component may employ any suitable ranging and/or angulating methods which may include, for example, angle of arrival, angle of departure, line-of-sight, time of arrival, time difference of arrival, two-way ranging, symmetrical double sided two way ranging, near-field electromagnetic ranging or any combination of the above.

The RTLS component may utilize any suitable technologies to provide real-time locating. For instance, the RTLS may employ ultra-wideband (UWB) technologies, ultrasound-based RTLS technologies, GPS-enabled RTLS, Wireless local area network, Bluetooth, and various other technologies to provide location tracking or proximity measurement. The accuracy may range from, for example, 0.1 m to 10 m. The RTLS component may select any combination of the aforementioned technologies to accommodate the deployment environment (e.g., indoor, outdoor, LAN availability, power consumption, accuracy requirement, etc.).

In some cases, the deployment of wireless radio transmitters (e.g., BLE sensors) within the worksite (e.g., construction site) may be designed to complement the deployment of the cameras of the computer vision system. A plurality of Beacon devices may be placed in various indoor locations, outdoor locations, or a combination of both. Deployment of the RTLS reference points may be designed such that the coverage of the RTLS component may at least partially overlap with the view or the scene capture by the computer vision system. This may beneficially supplement the location tracking per identity data to the descriptions of the 3D scene generated by the computer vision system. Additionally, the motion data (e.g., IMU data) captured by the RTLS component can be used to supplement the action classification/behavior identification performed by the CV system.

The LIDAR (light detection and ranging) system 130 may obtain three-dimensional information of the target scene by measuring distances to objects. For example, the emitting apparatus of a LIDAR system may generate a sequence of light pulses emitted within short time durations such that the sequence of light pulses may be used to derive a distance measurement point. The LIDAR system may provide three-dimensional (3D) imaging (e.g., 3D point cloud) or further analysis (e.g., obstacles detection or collision avoidance).

The LIDAR system may be deployed to any suitable locations within the worksite 100. The LIDAR system 130 may generate 3D point cloud data and/or analysis result (e.g., detection of an obstacle, detection of a collision, etc.). In some cases, the LIDAR system 130 may be configured to detect changes in the target scene (e.g., construction site) that may be relevant to safety of the workspace. For example, the changes detected by the LIDAR system may include new structures getting erected or taken down (i.e., construction progress), equipment installed or removed, materials delivered or removed from the scene, and other changes. Dynamic tracking of changes of the target scene may be utilized to estimate the precise location of workers in the target scene and the proximity between objects.

It is noted that the local network can have various other configurations or utilize other suitable techniques. For example, instead of or in addition to Beacons, proximity sensors such as radio or RFID beacons, Global Positioning System (GPS) beacons, wireless location beacons, or other reference features may be provided within an indoor area. The reference features may include visually discernible markers, IR-discernible markers, UV-discernible markers, and/or beacons that may emit a wireless signal. The wearable device may be equipped with the corresponding sensors (e.g., camera) to track the location of an individual relative to the location of the reference features.

As mentioned above, the multimodal safety system may employ an edge intelligence paradigm that data processing and inference is performed at the edge or edge computing server 140 (e.g., on-site server) while the predictive models may be built, developed and trained on a cloud/data center 150, and run on the edge computing server 140, user device such as dashboard tablet for onsite managers (e.g., hardware accelerator), personnel device (e.g., wearable device, mobile tag device 105) for inference.

In some cases, data managed or transmitted to the on-site edge computing server 140 may include, for example, data streams from the multimodal sensory systems/components, data from the personnel device such as the mobile tag device 105 or wearable device (e.g., motion data, physiological data, etc.) and/or user input data (e.g., user initiated report of an incident, alert, etc.). In some cases, data transmitted from the edge computing server 140 to the personnel device may include, for example, alert, warning, feedback instructions/guidance of worker behaviors or navigational information, generated by the edge computing server 140. In some cases, the data generated by the edge computing server 140 may include warning signal or interventions to the individuals 101 or the equipment 103 (e.g., machines, vehicles, asset, etc.). The feedback data comprises a control signal to effect an operation of the object. For example, the data may include interventions delivered to the associated individual or control signals to an equipment. For instance, the interventions may comprise operations instructions/guidance to a worker in compliance with safety laws or protocols, and the control signals to an equipment may include a command to shut down or change a machine state of the equipment to avoid collision or other hazardous events. Control signals to the equipment may be delivered as commands to PLC (programmable logic controller) which controls the equipment.

In optional cases, an additional user device 107 (e.g., tablet, mobile device) may be provided to a user. Alternatively, the user device may be the mobile tag device 105. The user device may be in communication with the edge computing server 140. Data transmitted from the user device to the edge computing server 140 may include, for example, user inputted data (e.g., confirmation of a task is completed), report provided by the worker, user-triggered alert (e.g., emergency alert) or a type of emergency. An individual or worker may also be permitted to trigger an alert via the user device or the mobile tag device. Data transmitted from the edge computing server to the user device may include, for example, alert, real-time information about a hazardous situation in the worksite, interventions and others as described above.

The edge computing server 140 may analyze the multimodal data streams with aid of an intelligent framework including one or more predictive models, the output result may be an alert indicating a detected incident such as fall or trip, a prediction of a impeding adverse event such as a hazardous condition in a work zone, and various other functionalities as described later herein. The edge computing server 140 may be coupled to a local database 141.

The local database 141 may comprise storage containing a variety of data consistent with disclosed embodiments. For example, the databases may store raw data collected from the user device 105, 107 (e.g., sensors and wearable device), data collected from the multimodal sensory systems, individual's or worksite's historical data, data about a predictive model (e.g., parameters, hyper-parameters, model architecture, threshold, rules, etc), data generated by a predictive model (e.g., intermediary results, output of a model, latent features, input and output of a component of the model system, etc.), incident report, record, workflow, safety protocols/law or regulatory related data, and user provided information (e.g., confirmation or denial of a prediction result, user information such as name, credential, or other user profile data, etc), algorithms, and the like. In certain embodiments, one or more of the local databases may be co-located with the edge computing server, may be co-located with one another on the local network, or may be located separately from other local devices. One of ordinary skill will recognize that the disclosed embodiments are not limited to the configuration and/or arrangement of the database(s).

The local database 141 may be one or more memory devices configured to store data. Additionally, the databases may also, in some embodiments, be implemented as a computer system with a storage device. In one aspect, the databases such as the local database and cloud databases may be used by components of the multimodal safety system to perform one or more operations consistent with the disclosed embodiments. One or more cloud databases and local database of the platform may utilize any suitable database techniques. For instance, structured query language (SQL) or "NoSQL" database may be utilized for storing the data transmitted from the edge computing system or the local network such as real-time data (e.g., location data, motion data, audio/video data, messages, etc), processed data such as report, alert, historical data, predictive model or algorithms. Some of the databases may be implemented using various standard data-structures, such as an array, hash, (linked) list, struct, structured text file (e.g., XML), table, JavaScript Object Notation (JSON), NOSQL and/or the like. Such data-structures may be stored in memory and/or in (structured) files. In another alternative, an object-oriented database may be used. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. In some embodiments, the database may include a graph database that uses graph structures for semantic queries with nodes, edges and properties to represent and store data. If the database of the present invention is implemented as a data-structure, the use of the database of the present invention may be integrated into another component such as the component of the present invention. Also, the database may be implemented as a mix of data structures, objects, and relational structures. Databases may be consolidated and/or distributed in variations through standard data processing techniques. Portions of databases, e.g., tables, may be exported and/or imported and thus decentralized and/or integrated.

In some cases, batch data, and/or individual records, report and the like may be generated by the edge computing server. Some of the data may be stored in the local database 141, while some of the data may be transmitted to a remote cloud 150.

The remote cloud 150 may comprise one or more cloud applications such as a management console or cloud analytics portal that can be accessed by superintendents, managers, directors, auditors or third-party entities. For example, upon detection of a safety infraction, workers may be immediately notified via haptic feedback on their personal alert device (e.g., wearable device, mobile tag device, etc.). Alert video and metadata may be simultaneously sent to a safety manager portal of the management console for post-event analysis and coaching. The analytics portal may deliver continuous safety data to help recognize improvements on worker behavior and operations management, as well as maintenance of devices, applications running on the edge computing server and on the cloud. The third-party entity may access the cloud data repository or cloud applications for various purposes such as internal auditors, construction site state control inspection and various others.

Data captured by the multimodal sensory systems, wearable device, user devices, as well as real-time feedback data and management data may be communicated via a network architecture well-suited for use in an industrial environment. In some cases, the network architecture may comprise a local network that is within the worksite. The local network may employ a topology or configuration capable of operating in challenging environments where obstructions or distance prevent wireless communication from a device to a hub. For example, the local network may employ industrial grade WiFi Mesh technology providing stronger and more reliable Wi-Fi signals. Alternatively, or in addition to, the local network may be a mesh network where devices communication with each other without a centralized device, such as a hub, switch or router.

In some embodiments, the network architecture may comprise interconnect infrastructure or fabric such as purpose-built hardware, herein referred to as "gateways," which are compatible with a wireless protocol. The local network may have stationary configuration or dynamic configuration as described above, and the real-time data may be transmitted to the edge computing server 140 for analysis. The edge computing server 140 may be local to the worksite. The edge computing server 140 may be in communication with a remote cloud/data center 150 through the gateways for downloading trained predictive models, and transmitting data such as report data (e.g., incident report, data collected from the multimodal sensory system, etc.) and various others for further analysis and management. For instance, sensor data stream may be transmitted to the edge computing server 140 in real-time for managing worksite operations, safety and risk, whereas a message package comprising batch data may be sent to the cloud at a lower frequency. Details about the remote management system and edge computing system are described later herein.

In some embodiments, the local network may be a combination of wired and wireless network. In some embodiments, the local network may comprise a WiFi-beacon configuration. For example, the network configuration may comprise one or more WiFi Mesh access points and one or more beacons deployed within the worksite. The network of devices may be deployed to provide full network coverage at the worksite. In some cases, the deployment of the network devices may be determined based on the layout (e.g., indoor/outdoor layout) of the worksite, safety zone or work zone (e.g., location where tasks to be performed) such that a reliable network coverage is provided in the workplace. The plurality of sensors and/or mobile tag devices carried by the individuals or an equipment may be in communication with the edge computing device and/or a remote entity (e.g., cloud) via the wireless network. In some cases, the local network may comprise a communication unit such as a WiFi controller or switch responsible for deciding a data path or data link according to a routing table. The network may also comprise a gateway connecting the local network to a remote network or network entity (e.g., cloud). The gateway device may provide long range RF wireless coverage (e.g., DLPWAN) to connect the local network. The gateway devices may allow long range communications. In some cases, the long-range RF wireless coverage may be a narrowband wireless network coverage. In some cases, the gateway devices may employ any suitable coding or modulation scheme such as binary shift keying (BSK), direct sequence spread spectrum (DSSS), frequency hopping spread spectrum, or Gauss frequency-shift keying (GFSK), Quadrature Amplitude Modulation (QAM) or quadrature phase shift keying (QPSK), power amplification, forward error correction (FEC) and, various other data transmission methods. In some cases, the gateway devices may switch power amplification, bandwidth, and/or bitrate in real-time to optimize for signal quality, transmission rate, and/or battery life.

In some cases, the gateways may connect to a wide area network (e.g., Internet) or cloud using any TCP/IP or UDP-based capable backhaul, such as Ethernet, Wi-Fi or cellular. The gateways may contain a radio frontend capable of listening to several MHz of RF wireless spectrum at a time, and/or configured to hear all network traffic transmitted within that spectrum. In some cases, the gateways may use synchronized frequency hopping schemes.

In some embodiments, the local network may be a combination of wired and wireless network. In some embodiments, the network configuration may comprise a plurality of Wi-Fi access points connected to a plurality of network switches or hubs (e.g., Ethernet switch), and one or more beacons. One or more Wi-Fi access points may be cable wired to one or more Ethernet switches. The plurality of network switches may be wire/cable connected to a power source. The network may also comprise a gateway such as the IS (Internet service) Wi-Fi access point to connect the local network to a remote network (e.g., Internet) or network entity.

In some embodiments, the local network may also comprise a plurality of devices such as Beacon devices for indoor/outdoor positioning or wireless communication. In some cases, the local network may allow for indoor/outdoor position tracking, such as populating the indoor/outdoor space with Bluetooth Low Energy (BLE) beacons that transmit a continuous stream of packets that are picked up by a BLE sensor on the mobile device or the wearable device.

Additionally, the network configuration may be dynamic. For example, one or more of the network devices may not be stationary within the worksite. In another example, the network configuration may be dynamically changing. In some cases, the local network may be a mesh network. In a mesh network, devices communication with each other without a centralized device, such as a hub, switch or router. In some cases, the network may be connected to a mesh network formed by a plurality of the sensors, mobile tag devices, or the wearable devices. The wireless mesh network may employ any suitable protocol, such as Wi-Fi, Bluetooth, BLE, Bluetooth Mesh, ZigBee, body area network (BAN), IrDA, ultra wideband (UWB), etc. For example, a Wi-Fi mesh network may be used to facilitate data transfer between the plurality of sensors and wearable devices. Sensory data collected by sensors located at different places may be transferred by hopping from one sensor to another until it reaches a destination (e.g., a local control unit, a central device, user device, gateway, etc.) according to a predetermined protocol across the mesh network. In some cases, a sensor in the mesh network may comprise a communication unit such as a Wi-Fi controller responsible for deciding a data path or data link according to a routing table. The mesh network may be low power consumption. The mesh network may be robust and reliable when a sensor is added or removed from the mesh network. A configuration of the mesh network may be configured to automatically adapt to an addition or removing of a sensor of the network. In some cases, the formation of a mesh network may not require a human set up. For example, once a sensor is placed on a wall surface or indoor room of a building, the sensor module may be automatically detected and become part of the mesh network. For instance, the sensor may check its routing table and other sensors in proximity to decide a data transfer path.

Multimodal Sensory Data Analysis Framework

Figure 2:
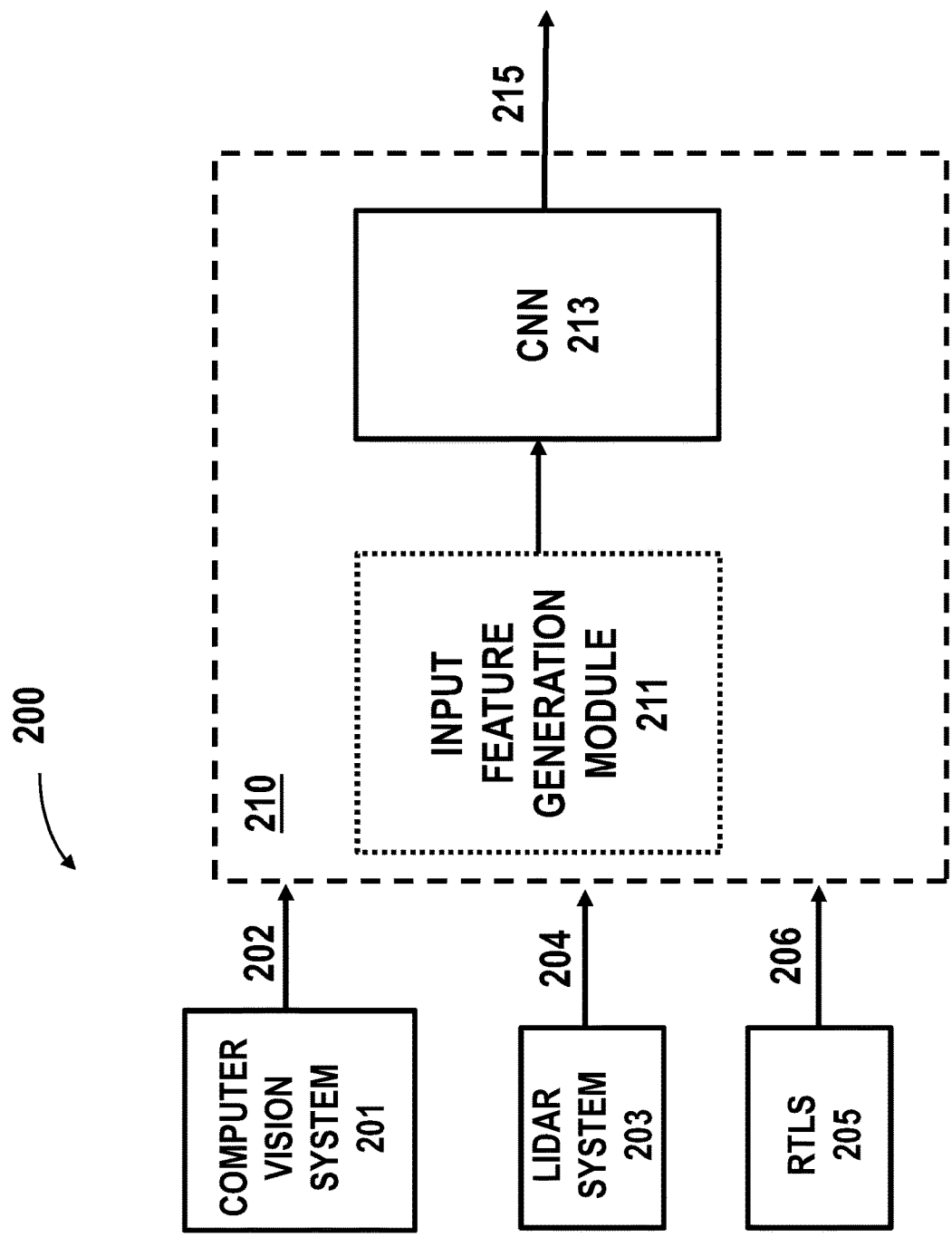
FIG. 2 schematically illustrates a framework for processing multimodal sensory data to generate an output for safety purpose, in accordance with some embodiments of the present disclosure.

FIG. 2 schematically illustrates a framework 200 for processing multimodal sensory data to generate an output for safety purpose. In some embodiments, the multimodal sensory data may be collected from computer vision system 201, a LIDAR system 203 and a RTLS system 205, and processed by an intelligent safety inference engine 210 to produce an output 215.

In some embodiments, the output 215 of the safety inference engine 210 may include safety related results such as a detected or predicted accident or adverse event within the target scene (e.g., construction site). The safety related results may include, but not limited to, detection of an incident (e.g., trip, slip, fall), detection of impeding collision, detection of fatigue level, predicting/forecasting a hazardous zone or condition and various others. As an example, the output may be detection and tracking of a large piece of moving equipment, such as a crane with a variable three-dimensional shape and orientation in space relative to other objects present in the target scene, including workers wearing mobile tags, other mobile and stationary equipment, and the building structures In some cases, the output 215 may include feedback information such as an alert, stimulation cues, warning, guidance delivered to the associated individual via the wearable device or mobile tag device. For example, the feedback information may be warnings about a hazardous condition in a worksite which can be generated and delivered to the individual prior to the individual entering the hazardous work zone or to warn the individual about a collision event. In some cases, an impeding hazardous event or hazardous condition may be predicted or forecasted. For example, the safety inference engine may be capable of forecasting an impeding adverse event a certain timespan before the occurrence of the event. The forecasting or prediction of an impending adverse event may be generated using a trained model.

In some embodiments, a warning signal and interventions can be proactively suggested. For example, the output 215 may further include interventions delivered to the associated individual or control signals to an equipment. For instance, the interventions to the workers may comprise workflow or operations instructions/guidance to a worker, navigational information to guide the worker within a construction site and the like. The interventions to the machines or equipment in a worksite may include, for example, control signals to the equipment to shut down or change a machine state of the equipment to avoid collision or other hazardous events.

The output 215 may be generated by the safety inference engine 213. In some embodiments, the safety inference engine 213 may include an input feature generation module 211 and a trained predictive model 213. For example, the detection of an incident (e.g., trip, slip, fall, collision), detection of behavior/actions not in compliance with safety protocol (e.g., not wear PPE, outside of safety zone, non-compliant operations, etc.), detection of fatigue level, predicting a hazardous zone or condition may be provided using the predictive model 213. A predictive model may be a trained model or trained using machine learning algorithm. The machine learning algorithm can be any type of machine learning network such as: a support vector machine (SVM), a naïve Bayes classification, a linear regression model, a quantile regression model, a logistic regression model, a random forest, a neural network, convolutional neural network CNN, recurrent neural network RNN, a gradient-boosted classifier or repressor, or another supervised or unsupervised machine learning algorithm (e.g., generative adversarial network (GAN), Cycle-GAN, etc.

The input feature generation module 211 may generate input feature dataset to be processed by the trained predictive model 213. In some embodiments, the input feature generation module 211 may receive data from the computer vision system 201, the LIDAR system 204, and the RTLS 205, extract features and generate the input feature datasets. In some embodiments, the data 202, 204, 206 received from the computer vision system, the LIDAR system, and the RTLS may include raw sensor data (e.g., image data, LIDAR data, time-series location data, IMU data, etc.). In some cases, the input feature generation module 211 may pre-process the raw sensor data (e.g., data alignment) generated by the multiple different sensory systems (e.g., sensors may capture data at different frequency) or from different sources (e.g., third-party application data). For example, data captured by camera, LIDAR, RTLS and telemetry data (e.g., temperature, physiologic data, IMU data, etc.) may be aligned with respect to time and/or identification (e.g., device ID, worker ID, equipment ID, etc.). In some cases, the output of the computer vision system may not include the identification of a detected object (e.g., facial recognition is not performed) and the detected object may be mapped to an object detected by the RTLS and LIDAR system based on the location, orientation and/or motion of the object.

In some embodiments, the data 202, 204, 206 received from the computer vision system, the LIDAR system, and the RTLS may include processed data. For example, data 202 from the computer vision system 201 may include descriptions of the target scene (e.g., construction site) such as object detection, object classification, extraction of the scene depth and estimation of relative positions of objects, extraction of objects' orientation in space, action identification/classification, behavior classification, anomaly detection, detection of an unsafe situation, or other descriptions. In some cases, the data 202 provided by the computer vision system may be generated using an optical technique that may not be as computationally expensive as using the computer vision system alone. At least some of the functionalities of the CV system can be replaced by or supplemented by the RTLS or LIDAR system. For instance, accuracy and efficiency of detecting and identifying objects in the scene via computer vision may be advantageously complemented by utilizing the location data of such objects and the object identities as provided by the RTLS. For example, the identity of a person wearing a tag in the field of view may be determined based on the mobile tag ID without performing CV techniques to detect the person or perform facial recognition from captured image. Similarly, the identification and/or location of an equipment in the target scene may be complemented by the data from the RTLS component. In some cases, action classification performed by the CV system may also be supplemented by the motion data (e.g., IMU data) collected by the RTLS component. This may beneficially reduce the amount of computation and provide a result less prone to errors due to limited camera resolution, poor illumination, long distance from camera, or due to wearing facial gear, such as personal protective equipment, and other limiting factors.

The computer vision system 201 may adopt any suitable optical techniques to generate the CV output data 202 (e.g., 3D or depth information of the target scene). For example, the CV output data 202 may be generated using passive methods that only require images, or active methods that require controlled light to be projected into the target scene. Passive methods may include, for example, object recognition, stereoscopy, monocular shape-from-motion, shape-from-shading, and Simultaneous Localization and Mapping (SLAM) and active methods may include, for example structured light and Time-of-Flight (ToF). In some cases, computer vision techniques such as optical flow, computational stereo approaches, iterative method combined with predictive models, machine learning approaches, predictive filtering or any non-rigid registration methods may be used to generate the descriptions of the 3D scene.

The RTLS 205 may generate RTLS output data 206 by processing the radio signals as described above using one and some combination of ranging and/or angulating methods to determine location. The ranging and/or angulating methods may include, for example, angle of departure, line-of-sight, time of arrival, time difference of arrival, two-way ranging, symmetrical double sided two way ranging, near-field electromagnetic ranging or other methods as described in FIG. 1. The RTLS 205 can be the same as the RTLS component as described in FIG. 1. For example, the RTLS may include a plurality RTLS reference points devices (e.g., transmitters or receivers), deployed throughout the target scene to provide the desired mobile tag coverage as well as a plurality of mobile tags attached to the individuals and/or equipment (e.g., vehicles, machines, asset, etc.) within the scene.

In some embodiments, the RTLS output data 206 may comprise at least time-series of location data and identification data (e.g., device ID). The RTLS output data 206 may not be captured at the same frequency as capturing the image data by the CV system or the LIDAR system. In some cases, the different types data may be combined with respect to time (e.g., time stamp) and/or identifies of the object.

The LIDAR (light detection and ranging) system 203 may obtain three-dimensional information of the target scene by measuring distances to objects. For example, the emitting apparatus of a LIDAR system may generate a sequence of light pulses emitted within short time durations such that the sequence of light pulses may be used to derive a distance measurement point. The LIDAR system may provide three-dimensional (3D) imaging (e.g., 3D point cloud) or further analysis (e.g., obstacles detection). The LIDAR output data 204 may include the 3D point cloud data and/or analysis result (e.g., detection of an obstacle, detection/prediction of a collision, etc.). The LIDAR system 203 can be the same as the LIDAR component as described in FIG. 1.

In one aspect, the present disclosure provides an integrated safety management platform for generating real-time feedback, controlling work flow, detecting, predicting and managing risks in a workplace. The integrated real-time platform may help workers or operators to comply with safety protocols and, improve worker situational awareness for hazardous work, and enforce pro-active safety behaviors based on real-time tracking and situation detection. The safety management platform may provide various functionalities including, for example, detecting an adverse event (e.g., fall or trip detection), predicting and forecasting hazardous condition in a work zone, enforcing behavior change to comply with safety laws and the like. In some cases, at least some of the above-mentioned functionalities may employ machine learning techniques to process multimodal sensory data as described elsewhere herein.

In some embodiments, the safety management platform may be capable of performing adverse event prediction and detection that adapt to individuals in a remote and/or hazardous workplace. In some embodiments, one or more functionalities of the safety management platform may involve using predictive models. For example, the detection of an incident (e.g., trip, slip, fall), detection of a fatigue level, predicting or forecasting a hazardous condition in a work zone may be provided using a predictive model. A predictive model may be a trained model or trained using machine learning algorithm. The machine learning algorithm can be any type of machine learning method such as: a support vector machine (SVM), a naïve Bayes classification, a linear regression model, a quantile regression model, a logistic regression model, a random forest, a neural network, convolutional neural network CNN, recurrent neural network RNN, a gradient-boosted classifier or repressor, or another supervised or unsupervised machine learning algorithm (e.g., generative adversarial network (GAN), Cycle-GAN, etc.

In some cases, the safety management platform may include a backend management system for training one or more predictive models. In some cases, the backend management system may perform continual training or improvement after deployment. In some cases, the predictive model provided by the platform may be dynamically adjusted and tuned to adapt to different individuals, different deployment environment, or different worksites conditions over time. The predictive model provided by the platform may be improved continuously over time (e.g., during implementation, after deployment). Such continual training and improvement may be performed automatically with little user input or user intervention by involving supervisors and managers as validators of the logged safety related events to accumulate the statistics of true positives, false positives, true negatives and false negatives. Negative events are safety related events that normally would not be logged because no safety related infraction was detected or predicted, or if the system confidence level was below the threshold to generate an event, and only generated for validation purposes at random time intervals or predetermined time intervals. The safety management platform may also allow remote supervisors and managers, or remote entities to monitor adverse event occurrence. backend management system can be applied in various scenarios such as in cloud or an on-premises environment.

Figure 3:
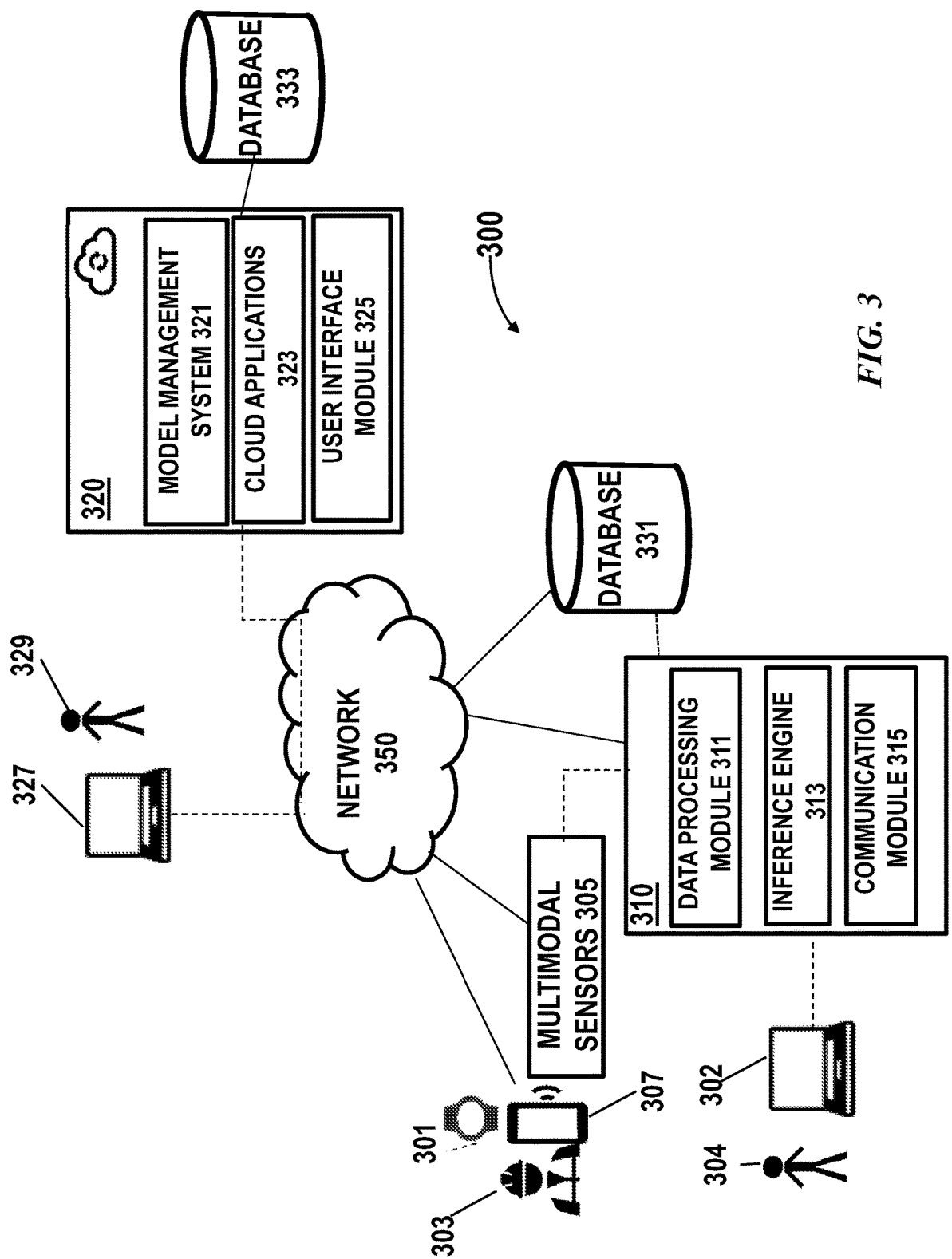
FIG. 3 schematically shows an example of a multimodal safety platform, in accordance with some embodiments of the present disclosure.

FIG. 3 schematically shows an example of a multimodal safety platform 300, in accordance with some embodiments of the invention. The multimodal safety platform 300 may include one or more mobile tag devices, personnel device or sensor devices 301, an edge computing system 310, a remote management system (e.g., a cloud) 320, and a database 333, 331. The multimodal safety platform 300 may optionally comprise one or more manager user devices 302 (e.g., smart tablet, desktop, laptop, etc.) allowing onsite manager, supervisors 304 to view the real-time safety conditions at the worksite. Each of the components 301, 302, 310, 320, 333, 331 may be operatively connected to one another via network 350 or any type of communication links that allows transmission of data from one component to another. The platform may employ an edge intelligence paradigm and the network 350 may have configurations as described above.

In some embodiments, one or more components of the multimodal safety platform 300 may reside on the remote entity 320 (e.g., a cloud). The remote entity 320 may be a data center, a cloud, a server, and the like that is in communication with one or more components local to the worksite. The remote entity can be the same as the cloud server as described in FIG. 1. For example, the remote entity may be in communication with the on-site edge computing system via a gateway.

In some cases, the remote entity (e.g., cloud) 320 may include services or applications that run in the cloud or an on-premises environment to remotely configure and manage the edge computing system over the network 350. In some embodiments, the remote entity may host a plurality of functional components such as a model creation and management system 321, one or more cloud applications 323, a user interface module 325 or other components.

In some cases, the cloud applications 323 may process or analyze data transmitted from the local worksite (e.g., construction site) for various use cases. The cloud applications may, for example, allow for a range of use cases such as post-even analysis, internal auditors, construction site state control inspection or management, and the like.

In some embodiments, cloud applications 323 may include management console or cloud analytics portal that can be accessed by remote superintendents, managers, or third-party entities 329. In some cases, the management console may allow users to manage deployment of sensors of the multimodal sensory system, the groups of workers 303, and analytics received from a plurality of different worksites. In some cases, the analytics received from a plurality of different worksites may be analyzed to extract patterns for improving performance of predictive models.

In some embodiments, the remote entity 320 may host or comprise a model creation and management system 321 for training, developing, deploying and managing predictive models. In some cases, the predictive model system may comprise a model creator and a model manager. In some cases, a model creator may be configured to train, develop or test a predictive model using data from a cloud data lake (e.g., database 333) and/or metadata database that stores contextual data (e.g., deployment context). The model manager may be configured to manage data flows among the various components (e.g., cloud data lake 333, metadata database, local database 331, edge computing system 310, model creator), provide precise, complex and fast queries (e.g., model query, metadata query), model deployment, maintenance, monitoring, model update, model versioning, model sharing, and various others. For example, the deployment context may be different depending on edge infrastructure (e.g., types of workplace, volume/area of worksite, applications onboard the edge infrastructure, construction site information, etc.) and the model manager may take into account the application manifest such as edge hardware specifications, deployment location, information about compatible systems, data-access manifest for security and privacy, emulators for modeling data fields unavailable in a given deployment and version management during model deployment and maintenance.

The edge intelligence paradigm may allow for data processing and inference performed at the edge or edge computing system 310 while the predictive models may be built, developed and trained on a cloud/data center 320, and run on the edge computing system 310, user device such as tablet or computing device 302 (e.g., hardware accelerator), personnel devices (e.g., mobile tag device or wearable device 301) for inference. For instance, the multimodal sensory data stream may be sent to the on-site edge computing system 310 in real-time for detecting incident (e.g., trip, slip or fall), collision avoidance, predicting and forecasting hazardous situations (e.g., identifying hazardous work zone or environmental conditions, etc.), identifying individual's physiological condition (e.g., fatigue, health condition, etc.), managing worksite operations, safety and risk, whereas a message package comprising batch data (raw sensor data or processed data) or incident report may be sent to the cloud 320 at a lower frequency.

In some embodiments, the predictive model can be the same as the safety inference engine as described in FIG. 2. In some cases, the predictive model of the safety inference engine for detecting an adverse event or predicting hazardous condition may be pre-trained on the cloud and transmitted to the edge computing system for implementation. In some cases, the predictive model may go through continual training as new sensor data and user feedback are collected. The continual training may be performed on the cloud or on the server 320. In some cases, sensor data may be transmitted to the cloud 320 which are used to update the model for continual training and the updated model (e.g., parameters of the model that are updated) may be downloaded to the local or edge computing system (e.g., user device, software application of the on-site system) for implementation.

In some cases, the cloud or data center 320 may further comprise a user interface (UI) module 325 for viewing analytics, reports, sensor data (e.g., image), and/or processed data. In some cases, the UI may also include a management UI for developing and deploying analytics expressions, deploying trained predictive models to the edge (e.g., edge gateway, edge infrastructure, safety inference engine, etc.) for inference, or configuring and monitoring the edge computing system. For example, the management UI may include a dashboard view of recently detected events, along with statistics for the day, week, month, or other time scale. A user may click a given event to view more details such as the identity of the worker, event type, and time and location of the event. Alternatively or in addition to, the analytics result may be displayed on a virtual map of the worksite within a graphical user interface (GUI).

In some cases, the graphical user interface (GUI) or user interface provided by the UI module 325 may be provided on a display of a user device 327. The display may or may not be a touchscreen. The display may be a light-emitting diode (LED) screen, organic light-emitting diode (OLED) screen, liquid crystal display (LCD) screen, plasma screen, or any other type of screen. The display may be configured to show a user interface (UI) or a graphical user interface (GUI) rendered through a mobile application or cloud application (e.g., via an application programming interface (API) executed on the manager's user device 327). Similarly, a GUI may also be provided by the edge computing system 320 and the GUI may be provided on a display of the wearable device, personnel device, mobile tag device 301, user device 302 at the worksite. The GUI may be rendered through an application (e.g., via an application programming interface (API) executed on the wearable device, personnel device, user device, local supervisor's user device, etc.)

In some cases, the cloud or data center 320 may include applications that allow for integrated administration and management, including monitoring or storing of data in the cloud database 333 or at a private data center.

The cloud database 333 may be one or more memory devices configured to store data. Additionally, the databases may also, in some embodiments, be implemented as a computer system with a storage device. One or more cloud databases 333 of the platform may utilize any suitable database techniques as described above.

The cloud database 333 may comprise storage containing a variety of data consistent with disclosed embodiments. For instance, the databases may store, for example, selected real-time data transmitted form the local network (e.g., data collected from the user device, multimodal sensory systems, and wearable device), each individual's or worksite's historical data, training datasets, data about a predictive model (e.g., parameters, hyper-parameters, model architecture, performance metrics, threshold, rules, etc), data generated by a predictive model (e.g., intermediary results, output of a model, latent features, input and output of a component of the model system, etc.), incident report, record and user provided information (e.g., user information such as name, credential, etc), safety law related data, algorithms, and the like. In certain embodiments, one or more of the databases may be co-located with the server 320, may be co-located with one another on the network, or may be located separately from other devices. One of ordinary skill will recognize that the disclosed embodiments are not limited to the configuration and/or arrangement of the database(s).

In some embodiments, the platform 300 may construct the database 333 for fast and efficient data retrieval, query and delivery. For example, the cloud 320 may provide customized algorithms to extract, transform, and load (ETL) the data. In some embodiments, the management console residing on the cloud may construct the databases using proprietary database architecture or data structures to provide an efficient database model that is adapted to large scale databases, is easily scalable, is efficient in query and data retrieval, or has reduced memory requirements in comparison to using other data structures.

The edge computing system 310 may implement the framework as described in FIG. 2 for fusing and processing the multimodal sensory data. In some embodiments, the edge computing system 310 may be an edge intelligence platform. For example, the edge computing system 310 may be a software-based solution based on fog or edge computing concepts which extend data processing and inference closer to the edge (e.g., construction site). While edge computing may refer to the location where services are instantiated, fog computing may imply distribution of the communication, computation, and storage resources and services on or in proximity to (e.g., within 5 meters or within 1 meter) devices and systems in the control of end-users or end nodes. Maintaining close proximity to the edge devices (e.g., edge computing server, sensors, user devices, personnel devices, etc.) rather than sending all data to a distant centralized cloud, minimizes latency allowing for maximum performance, faster response times, and more effective maintenance and operational strategies. It also significantly reduces overall bandwidth requirements and the cost of managing widely distributed networks.

In an example of a deployment scenario, the remote management system 320 can be multi-tenant aware providing afore-mentioned services to multiple tenants simultaneously while providing secure isolation of information related to user data and safety data among the multiple tenants (e.g., multipie worksites). The edge computing system 310 and/or the remote entity 320 may employ any suitable technologies such as container and/or micro-service. For example, the application of the edge computing system (e.g., inference engine, etc.) can be a containerized application. The edge computing system may deploy a micro-service based architecture in the software infrastructure at the edge such as implementing an application or service in a container. In another example, the cloud applications and/or the predictive model system may provide a management console or cloud analytics backed by micro-services.

In some embodiments, the edge computing system 310 may comprise a plurality of components including a data processing module 311, an inference engine 313, and a communication module 315.

In some cases, at least a portion of data processing can be performed at the edge computing system 310. The data processing module 311 may provide pre-processing of stream data and batch data collected from the multimodal sensory devices 305, user devices 301 and other devices connected to the local network at the worksite. In some embodiments, the data processing module 311 may support ingesting of sensor data into a local storage repository 331 (e.g., local time-series database), data cleansing, data enrichment (e.g., decorating data with metadata), data alignment, data annotation, data tagging, data aggregation, and various other data processing. Data from the user devices (e.g., dashboard tablet, mobile device, wearable device, etc.), multimodal sensor system 305, mobile tag device 301 and various other sources as described elsewhere herein may be ingested and processed by the data processing module. The data provided or outputted by the sensors may be a binary data stream. The transmission or delivery of this data from the sensors to the data processing module can be push or pull methods. In some cases, the data processing module may enrich the incoming data from the sensors by decoding the raw binary data into consumable data formats (such as JavaScript Object Notation) and also decorating with additional necessary and useful metadata.

In some cases, the data processing module 311 may be configured to preprocess continuous streams of raw data or batch data transmitted from the local network and prepare the data to be processed by the inference engine. Data processing may include, for example, data normalization, labeling data with metadata, tagging, data alignment, data segmentation, and various others. In some cases, the data processing module 311 can be the same as the input feature generation module as described in FIG. 2. For instance, data from the multimodal sensory systems 305 may be processed so it can be fed into a trained CNN model. In some cases, the processing methodology may be programmable through APIs by the developers constructing the machine learning analysis via the cloud applications or the UI portal 325.

The data processing module 311 may process the real-time data collected at the edge device or local devices before sending to the cloud. In some cases, at least a portion of the pre-processed data may be transmitted to the cloud for training or updating a model. In some cases, the data processing module 311 may be coupled to the communication module 315 to prepare the data for transmission based on a transmission scheme. For example, the data processing module 311 may also be configured to aggregate the raw data across a time duration (e.g., about 1, 2, 3, 4, 5, 6, 7, 8, 9, 10 seconds, about 1, 2, 3, 4, 5, 6, 7, 8, 9, 10 minutes, about 1, 2, 3, 4, 5, 6, 7, 8, 9, 10 hours, etc.), across data types (e.g., accelerometer data, physiological data, location data, audio data, video data, user input, image data, etc.) or different sources, and send the aggregated data to a remote entity 320 (e.g., cloud) as a package.

The inference engine 313 can be the same as the safety inference engine as described in FIG. 2. In some cases, the inference engine 313 may process real-time data generated by the multimodal sensory systems, the user devices (e.g., dashboard tablet, mobile device, etc.), sensors, wearable device, mobile tag device 301 using one or more predictive models. Similarly, the one or more predictive models can be downloaded from the cloud. The inference engine 313 may perform various functions such as generating preventive procedural alerts and warnings, detecting worker-based metrics (e.g., fatigue level, health condition, under-stress, physiological state, etc.), detecting an incident (e.g., trip, slip or fall detection), predicting an impeding adverse event (e.g., hazardous condition forecasting, identifying a hazardous situation or conditions in a work zone, etc.), generating real-time interventions, and identifying an efficient workflow or tasks assignment for one or more workers and one or more groups.

The communication module 315 may be configured to determine which of the local data or which portion of the local data stays in the local database 331, is to be moved/transmitted to the cloud database 333. The communication module may also determine which of the local data or which portion of the local data is to be communicated to which data center, a cloud database or third party entity, when and at what frequency this portion of data is transmitted. In some cases, data that is off-loaded or moved to the cloud database may be deleted from the local database for improved storage efficiency. Alternatively, data in the local database may be preserved for a pre-determined period of time after it is off-loaded to the cloud database.

In some embodiments, data may be transmitted from the edge computing system or local database to the cloud according to a transmission scheme. In some cases, the transmission scheme may specify which of the local data or which portion of the local data stays in the local database 331, is to be moved/transmitted to the cloud database 333. The transmission scheme may also specify which of the local data or which portion of the local data is to be communicated to which data center, a cloud database or third party entity, when and at what frequency this portion of data is transmitted. For example, a data transmission scheme may comprise timing of transmission such as delay time or frequency, communication protocol, compression or encryption method used for transmission, and various others (e.g., regulatory rules regarding privacy before data is transmitted).

In some cases, the data transmission scheme may also specify how data are transmitted. For instance, the data transmission scheme may specify compression methods (e.g., lossless compression algorithm, lossy compression algorithms, encoding, etc), or encryption methods (e.g., RSA, triple DES, Blowfish, Twofish, AES, etc) used for transmission. In some cases, a data compression method and/or encryption method may be determined for a transmission based on rules. For example, a rule may determine the compression method and/or encryption method according to a given type of data, the application that uses the data, destination of the data and the like. The rules for determining data compression method and/or encryption method may be stored in a local database, such as the local database 331, accessible to the communication module 315 or the edge computing system 310. In some cases, the rule for determining the data compression method and/or encryption method may be part of the rule for determining the data transmission. For instance, a ruleset for determining the encryption method or compression method may be called (e.g., by ruleset identifier) for determining the data transmission scheme.

The local database 331 can be the same as the local database as described in FIG. 1. For example, the local database 331 may comprise storage containing a variety of data consistent with disclosed embodiments. For example, the databases may store, for example, raw data collected from the user device, sensors and wearable device, individual's or worksite's historical data, data about a predictive model (e.g., parameters, hyper-parameters, model architecture, threshold, rules, etc), data generated by a predictive model (e.g., intermediary results, output of a model, latent features, input and output of a component of the model system, etc.), incident report, and user provided information (e.g., user information such as name, credential, etc), downloaded predictive models, algorithms, and the like. In certain embodiments, one or more of the databases may be co-located with the edge computing server, may be co-located with one another on the local network, or may be located separately from other local devices. One of ordinary skill will recognize that the disclosed embodiments are not limited to the configuration and/or arrangement of the database(s).

In some embodiments, the edge computing system 310 may construct the local database 331 for fast and efficient data retrieval, query and delivery. For example, the edge computing system may provide customized algorithms to extract, transform, and load (ETL) the data. In some embodiments, the edge computing system may construct the databases using proprietary database architecture or data structures to provide an efficient database model that is adapted to large scale databases, is easily scalable, is efficient in query and data retrieval, or has reduced memory requirements in comparison to using other data structures.

The edge computing system 310 may analyze input data (e.g., sensor data) from the personnel device, multimodal sensory devices 305, mobile tag device 301 or wearable devices in order to generate real-time safety related results (e.g., predict and detect an adverse event) and to provide feedback information (e.g., alert, stimulation cues, warning, guidance, etc.). One or more of the functionalities may be implemented using software, hardware, or a combination of software and hardware in one or more of the above-mentioned components within the platform.

In optional cases, a worker may be provided an additional personnel device 307. The personnel device 307 and/or the mobile tag device 301 may comprise one or more sensors. The one or more sensor (e.g., physiologic sensor, kinematic sensor, motion sensor, audio sensor, field sensor, etc.) can be controlled by an application/software configured to collect sensory data about the user (e.g., motion/movement of the user, physiological condition of the user, etc.) or the ambient environment. The mobile tag device and the personnel device can be the same as those as described above. The multimodal sensory devices 305 can be the same as the multimodal sensor systems/components (i.e., computer vision system, RTLS, LIDAR) as described elsewhere herein.

In optional embodiments, the personnel device 307 and/or the mobile tag device 301 may be configured for delivering an alert, a warning, guidance, or displaying information for enforcing safety operations. The personnel device and/or the mobile tag device 301 may be a computing device configured to perform one or more operations consistent with the disclosed embodiments. Examples of personnel devices may include, but are not limited to, mobile devices, smartphones/cellphones, tablets, personal digital assistants (PDAs), laptop or notebook computers, desktop computers, virtual reality systems, augmented reality systems, microphones, or any electronic device capable of analyzing, receiving ((e.g., receiving user input), providing or displaying certain types of feedback data (e.g., adverse event analysis, prediction result, alert, warning, interventions, etc.) to a user.

The personnel devices 307 may be a handheld object. The personnel devices may be portable. The personnel devices may be carried by a human user. In some cases, the user device may be located remotely from a human user, and the user can control the user device using wireless and/or wired communications.

In some cases, one or more manager user devices 302 (e.g., smart tablet, desktop, laptop, etc.) may be provided allowing onsite manager, supervisors 304 to view the real-time safety conditions at the worksite. The manager user devices may include one or more processors that are capable of executing non-transitory computer readable media that may provide instructions for one or more operations consistent with the disclosed embodiments. The manager user devices may include one or more memory storage devices comprising non-transitory computer readable media including code, logic, or instructions for performing the one or more operations. The manager user devices may include software applications that allow the manager user devices to communicate with and transfer data between sensors 305, wearable device or user device 307, mobile tag device 301 edge computing server 310, the cloud 320, and/or database 331, 333. The manager user device or personnel devices may include a communication unit, which may permit the communications with one or more other components in the platform 300. In some instances, the communication unit may include a single communication module, or multiple communication modules. In some instances, the manager user device or personnel devices may be capable of interacting with one or more components in the platform 300 using a single communication link or multiple different types of communication links in consistent with the network configuration and architecture as described elsewhere herein.

In some embodiments, the manager user device 302, personnel device 307, or mobile tag device may include a display. The display may be a screen. The display may or may not be a touchscreen. The display may be a light-emitting diode (LED) screen, OLED screen, liquid crystal display (LCD) screen, plasma screen, or any other type of screen. The display may be configured to show a user interface (UI) or a graphical user interface (GUI) rendered through an application (e.g., via an application programming interface (API) executed on the user device). The GUI rendered on the manager user device 302 may show real-time safety result, alert, visual stimulations upon a prediction/detection, and images, charts, interactive elements relating to the construction progress, operations within a construction site, a virtual map or a management portal displaying live conditions in the worksite, and various other information. The user interface rendered on the user device 307 or mobile tag device 301 may show real-time alert (e.g., visual or tactile stimulations) upon a prediction/detection, interventions, and other real-time prediction and detection result. The user interface may permit a worker 303 to input user feedback (e.g., acknowledge receipt of a guidance, confirming a detected event, trigger an alert, etc.). One or more of the applications, user interfaces (e.g., dashboard, safety portal, etc.) may be hosted by the edge computing server and/or run on the user device 302, mobile tag device and personnel device 307.

The edge computing system 310 may be implemented in software, hardware or a combination of both. In some cases, the edge computing system 310 may be implemented by one or more processors. For example, the edge computing system 310 may be implemented by an edge computing server which can be one or more server computers configured to perform one or more operations consistent with the disclosed embodiments. In one aspect, the server may be implemented as a single computer, through which user device, wearable device or sensors are able to communicate with the edge computing system and database. In some embodiments, the user device, wearable device or sensors communicate with the edge computing system directly through the local network. In some embodiments, the server may embody the functionality of one or more of the edge computing system. A server may include known computing components, such as one or more processors, one or more memory devices storing software instructions executed by the processor(s), and data. A server can have one or more processors and at least one memory for storing program instructions. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the methods can be implemented in hardware components or combinations of hardware and software such as, for example, ASICs, special purpose computers, or general purpose computers.

The various functions performed supported by the edge or edge device such as data processing, making inference using a trained model and the like may be implemented in software, hardware, firmware, embedded hardware, standalone hardware, application specific-hardware, or any combination of these. The edge computing system, edge computing server, and techniques described herein may be realized in digital electronic circuitry, integrated circuitry, specially designed ASICs (application specific integrated circuits), computer hardware, firmware, software, and/or combinations thereof. These systems, devices, and techniques may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, and/or device (such as magnetic discs, optical disks, memory, or Programmable Logic Devices (PLDs)) used to provide machine instructions and/or data to a programmable processor.

Network 350 may be a network that is configured to provide communication between the various components illustrated in FIG. 3. The network may be implemented, in some embodiments, as one or more networks that connect devices and/or components in the network layout for allowing communication between them. For example, user device 302, sensors 305, wearable device or mobile tag device 301, personnel device 307, edge computing system 310, cloud 320 and database 331, 333 may be in operable communication with one another over network 350. The network may employ a configuration and layout as described in FIG. 1. Direct communications may be provided between two or more of the above components. For example, the network may be based on a combination of WiFi Mesh and Beacon or a combination of WiFi and BLE Beacon. However, other communication techniques can also be used. The direct communications may occur without requiring any intermediary device or network. Indirect communications may be provided between two or more of the above components. The indirect communications may occur with aid of one or more intermediary device or network. For instance, indirect communications may utilize a telecommunications network. Indirect communications may be performed with aid of one or more router, communication tower, satellite, or any other intermediary device or network. Examples of types of communications may include, but are not limited to: communications via the Internet, Local Area Networks (LANs), Wide Area Networks (WANs), Bluetooth, Near Field Communication (NFC) technologies, networks based on mobile data protocols such as General Packet Radio Services (GPRS), GSM, Enhanced Data GSM Environment (EDGE), 3G, 4G, 5G or Long Term Evolution (LTE) protocols, Infra-Red (IR) communication technologies, and/or Wi-Fi, and may be wireless, wired, or a combination thereof. In some embodiments, the network may be implemented using cell and/or pager networks, satellite, licensed radio, or a combination of licensed and unlicensed radio. The network may be wireless, wired, or a combination thereof.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A multimodal system for managing safety in an industrial environment comprising:
    an image sensor configured to capture information defining an image of the industrial environment;
    a wireless sensing device configured to generate location information characterizing location of a user within the industrial environment;
    a distance sensor configured to generate distance information identifying a distance to a surface within the industrial environment; and
    one or more hardware processors configured by machine-readable instructions to:
        receive the image information from the image sensor;
        generate computer vision output information based on the image information;
        receive a stream of information including the computer vision output information, the location information generated by the wireless sensing device, and the distance information generated by the distance sensor;
        generate an input feature dataset based on the stream of information,
        process the input feature dataset using a machine learning algorithm trained model to generate a safety related result and feedback data, and
        deliver the feedback data to the object via a mobile tag device deployed to the user.

2. The multimodal system of claim 1, wherein the computer vision output information includes a description of the industrial environment.

3. The multimodal system of claim 1, wherein the computer vision output information includes an action identified for the object.

4. The multimodal system of claim 1, wherein the wireless sensing device includes the mobile tag device and/or one or more reference point devices deployed within the industrial environment to provide a coverage that at least partially overlaps with a view of the image sensor.

5. The multimodal system of claim 1, wherein the wireless sensing device includes a motion sensor collecting motion information characterizing motion of the user.

6. The multimodal system of claim 1, wherein the distance information is analyzed to detect a change in the industrial environment.

7. The multimodal system of claim 6, wherein the change is related to a construction progress, materials, or an equipment within the industrial environment.

8. The multimodal system of claim 1, wherein the mobile tag device is configured to track identity information of the user, wherein the input feature dataset is generated by aligning the data stream with respect to time and/or the identity information of the user.

9. The multimodal system of claim 1, wherein the feedback information includes a control signal to effect an operation of the user.

10. The multimodal system of claim 1, wherein the safety related result includes a detection of an action of the user that does not comply with a safety protocol and the feedback information includes an alert indicative of the detection.

11. A method for managing safety in an industrial environment comprising:
    capturing, using an image sensor, image information defining an image of the industrial environment;
    generating computer vision output data based on the image information;
    generating, using a wireless sensing device, location information characterizing location of a user within the industrial environment;
    generating, using a distance sensor, distance information identifying a distance to a surface within the industrial environment;
    receiving a stream of information including the computer vision output information, the location information, and the distance information;
    processing the input feature dataset using a machine learning algorithm trained model to generate a safety related result and feedback data, and
    delivering the feedback information to a mobile tag device deployed to the user.

12. The method of claim 11, wherein the computer vision output information includes a description of the industrial environment.

13. The method of claim 11, wherein the computer vision output information includes an action identified for the object.

14. The method of claim 11, wherein the wireless sensing device includes the mobile tag device and/or one or more reference point devices deployed within the industrial environment to provide a coverage that at least partially overlaps with a view of the image sensor.

15. The method of claim 11, wherein the wireless sensing device includes a motion sensor collecting motion information characterizing motion of the user.

16. The method of claim 11, wherein the distance information is analyzed to detect a change in the industrial environment.

17. The method of claim 16, wherein the change is related to a construction progress, materials, or an equipment within the industrial environment.

18. The method of claim 11, wherein the mobile tag device is configured to track identity information of the user, wherein the input feature dataset is generated by aligning the data stream with respect to time and/or the identity information of the user.

19. The method of claim 11, wherein the feedback information includes a control signal to effect an operation of the user.

20. The method of claim 11, wherein the safety related result includes a detection of an action of the user that does not comply with a safety protocol and the feedback information includes an alert indicative of the detection.

* * * * *